W. H. HART, Jr.

BOX FOR PACKING NECKTIES.

No. 4,163. Reissued Oct. 25, 1870.

Witnesses:
M. H. Hinckel
J. C. Brown

Inventor:
Wm. H. Hart Jr.
by Wiederhein & Norris
Attys

THE NORRIS PETERS CO. PHOTO-LITHO., WASHINGTON, D. C.

United States Patent Office.

WILLIAM H. HART, JR., OF PHILADELPHIA, PENNSYLVANIA.

Letters Patent No. 76,186, dated March 31, 1868; reissue No. 4,163, dated October 25, 1870.

DIVISION B.

IMPROVEMENT IN BOXES FOR PACKING NECK-TIES.

The Schedule referred to in these Letters Patent and making part of the same

*To all whom it may concern:*

Be it known that I, WILLIAM H. HART, JR., of the city of Philadelphia, in the State of Pennsylvania, did invent a new and improved Box for Packing Neck-Ties; and I do hereby declare the following to be a full, clear, and exact description thereof, which will enable others skilled in the art to which it appertains to make and use my invention, reference being had to the accompanying drawing which forms a part of this specification, and in which—

The same parts are denoted by the same letters in all the figures.

Figure 1:
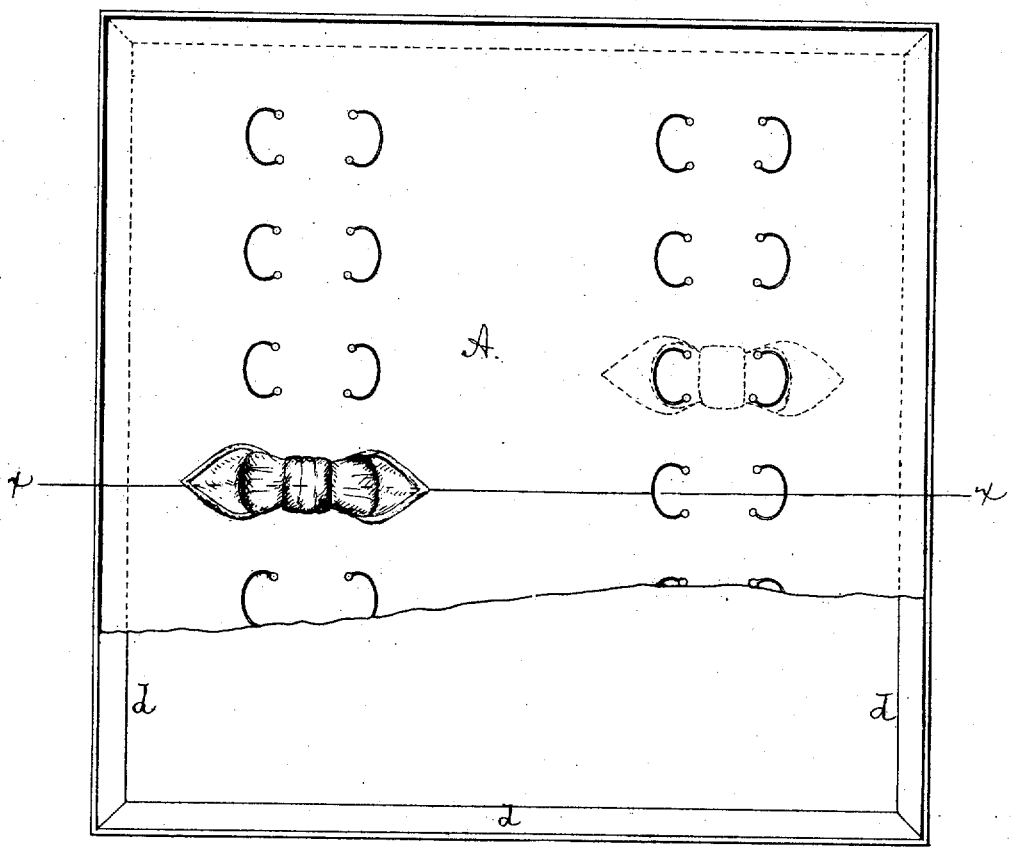
Figure 1 is a top or plan view of the device, illustrating my invention, the holder for the ties being partly cut away.
Figure 2:
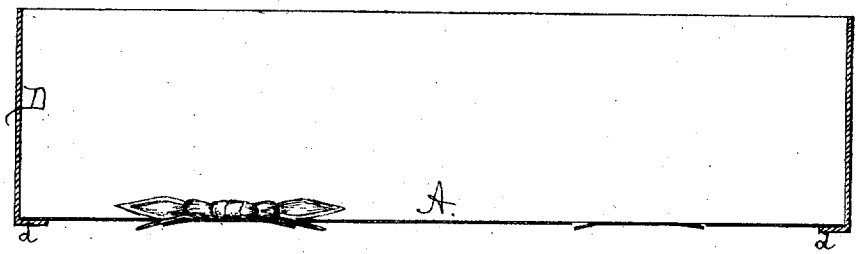
Figure 2 is a vertical section on line *x x*, fig. 1.

The invention consists in constructing the box with supporting-ledges in lieu of a permanent bottom, so that a holder used as a show-card may be used as the bottom of a box, if desired.

A in the drawing represents a card or holder, on which the neck-ties are arranged and retained.

The body or frame D of the box is provided with ledges or supporting-strips, *d*, in lieu of a permanent bottom. When a box is to be packed for transportation, a show-card, A, is laid on the ledges, so as to form the bottom of the box.

What I claim as new, and desire to secure by Letters Patent of the United States, is—

The box-body or frame D, constructed with ledges or supports, *d*, to adapt the show-card or holder to be used as bottom to the box, substantially as described.

WM. H. HART, JR.

Witnesses:

WM. R. WRIGHT,

J. M. COLGAN.